Jan. 10, 1928.  
H. A. SHEETS  
MOWER  
Filed Jan. 25, 1926
1,656,078
3 Sheets-Sheet 3
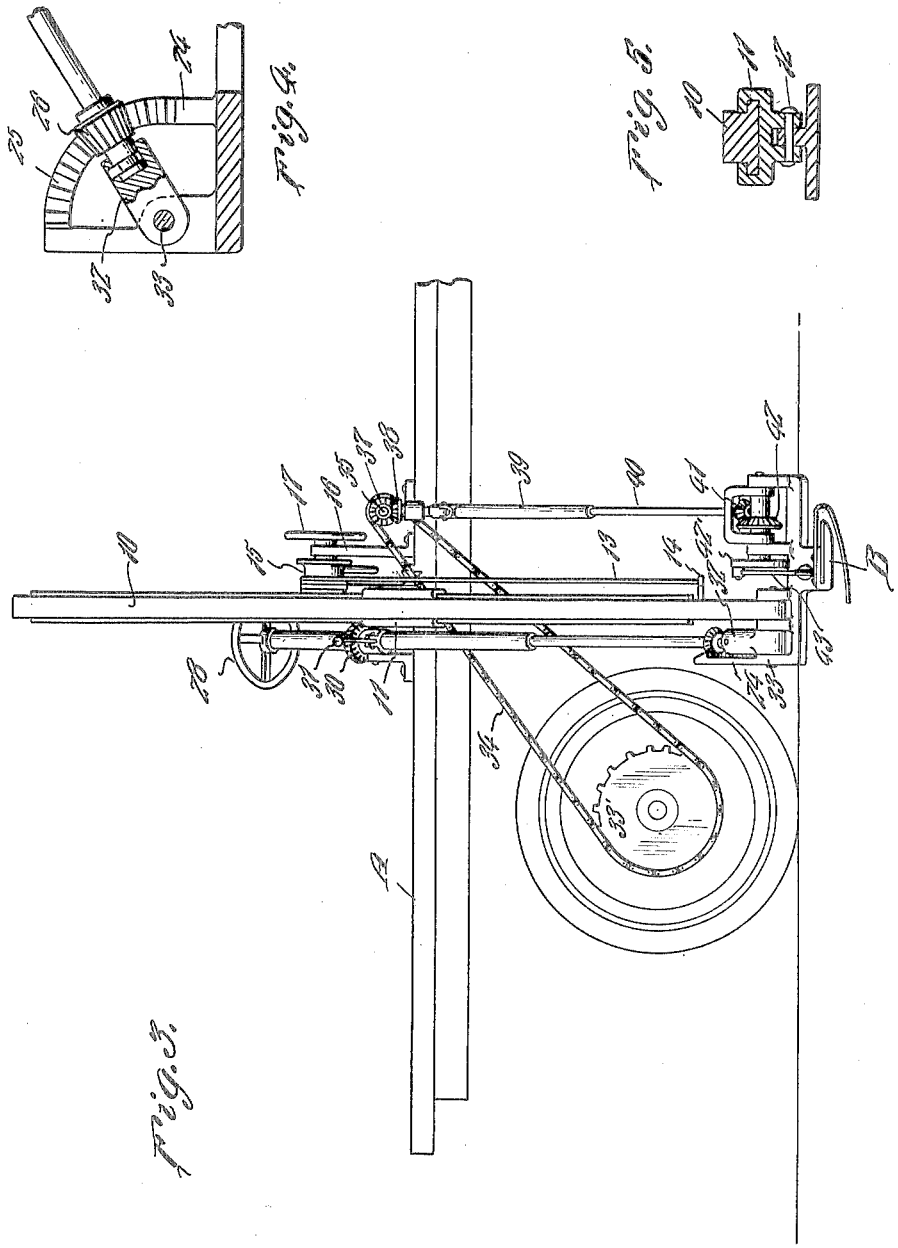

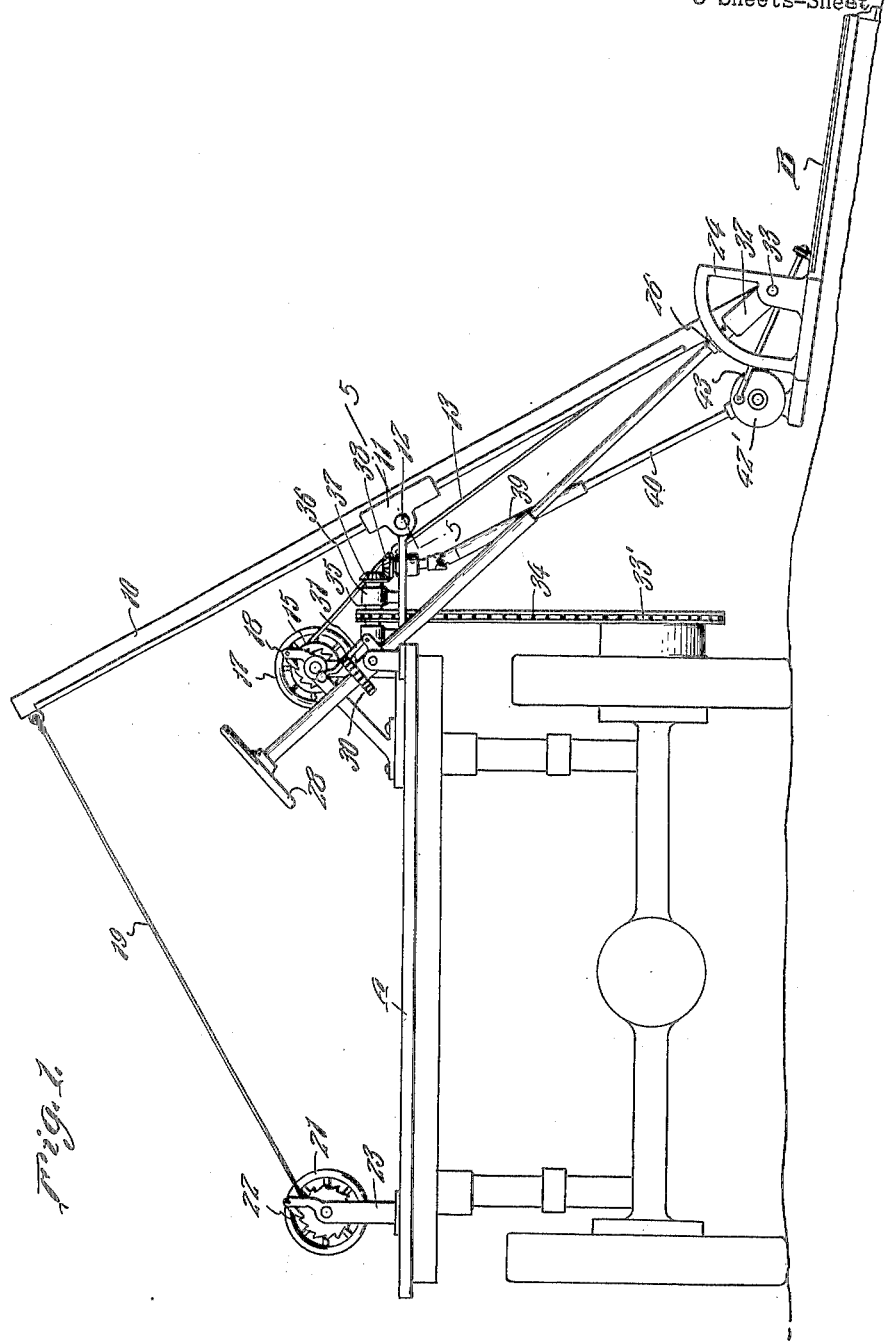

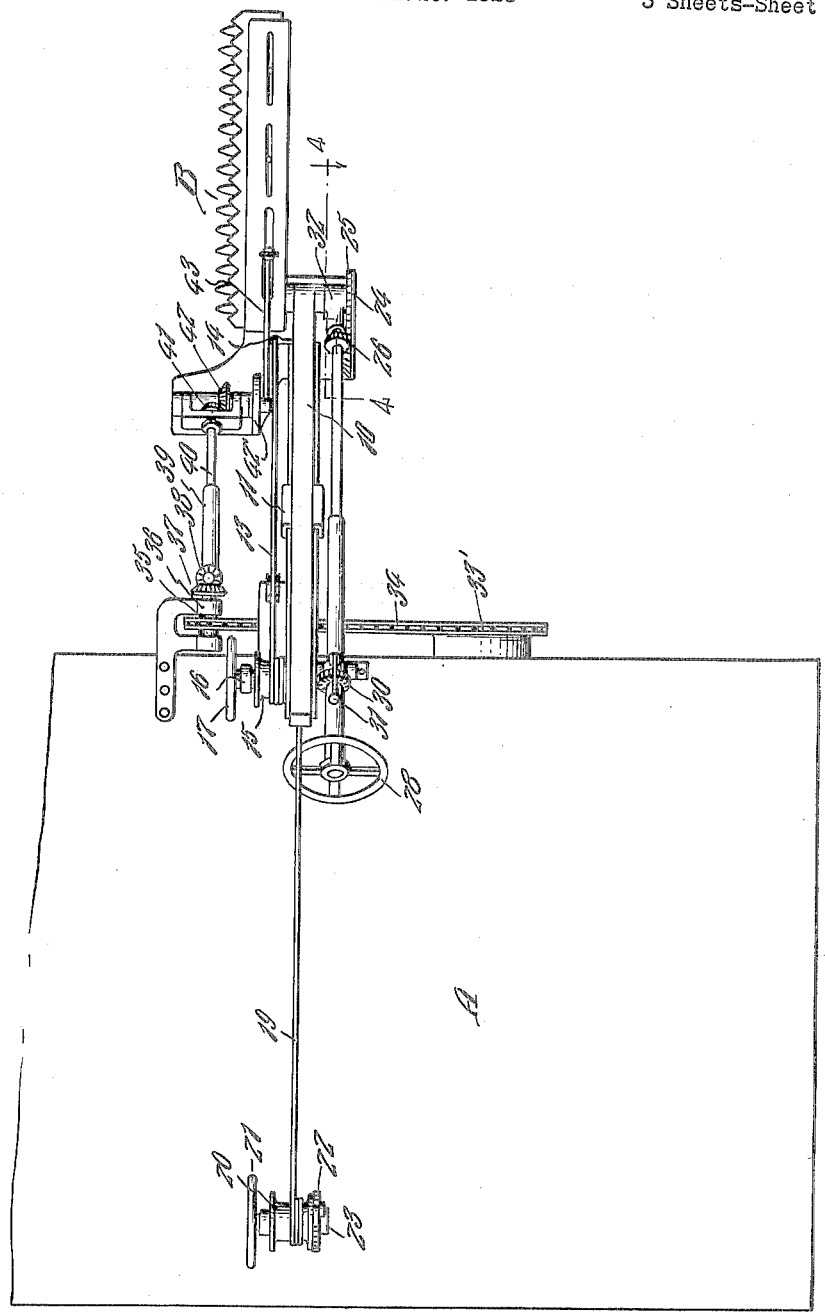

Patented Jan. 10, 1928.

1,656,078

UNITED STATES PATENT OFFICE.

HALLEY A. SHEETS, OF FAIRFIELD, NEBRASKA.

MOWER.

Application filed January 25, 1926. Serial No. 83,631.

This invention has for its object the provision of a mower attachment for motor operated trucks or the like, and is primarily intended for cutting down weeds and grass in ditches along a road or highway, and more especially in places where the presence of gravel renders the use of a grader impossible for this purpose.

In carrying out the invention I make use of a mower supported on a truck and operated from the rear wheel thereof, said cutting mechanism being capable of tilting adjustment with relation to the ground, and also capable of being vertically and horizontally adjusted with relation to the ground independently of the tilting adjustment, so that the cutting mechanism may be arranged to operate under various conditions.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the attachment showing how it is mounted upon a motor operated truck.

Figure 2 is a top plan view of the attachment mounted on the truck.

Figure 3 is a view taken at a right angle to Figure 1.

Figure 4 is a sectional view on line 4—4 of Figure 2.

Figure 5 is a sectional view on line 5—5 of Figure 1.

Referring to the drawings in detail, A indicates generally a movable carrier, which may be of any suitable design or construction, but for the purpose of illustration the carrier herein shown is in the nature of a motor operated truck.

The cutting mechanism per se is of ordinary well known construction, and is indicated generally B. The cutting mechanism is arranged at the lower end of a beam 10 which is preferably of the cross sectional contour shown in Figure 5, for sliding movement through a suitable guide 11. This guide is pivotally mounted as at 12 at one side of the carrier as clearly shown in Figure 1, so that the beam 10 together with the cutting mechanism B can be moved vertically with relation to the ground, or adjusted to position the cutting mechanism B at any desired distance away from the carrier when adjusted horizontally. For adjusting the beam 10 and the cutting mechanism B vertically in the manner just stated, I employ a cable 13 which is secured to the beam 10 at an appropriate point in its length as at 14, this cable being trained over a drum 15 journaled in a suitable bracket 16 mounted on the carrier A. The drum is operated by means of a hand wheel 17, so that the cable 13 can be wound about or unwound from the drum as the occasion may require, the drum being held against retrograde movement by means of a pawl and ratchet mechanism, indicated at 18. Now, for tilting the beam 10 in order to shift the cutting mechanism B in a horizontal plane toward and away from the carrier, and thus position the mower in proper relation to the work, I employ a cable 19 which is secured to the upper end of the beam as shown in Figure 1, and which cable is adapted to be wound about and unwound from a drum 20 operated by means of a hand wheel 21. Consequently the cable 19 can be operated in a convenient manner, while the drum is held against retrograde movement by a pawl and ratchet mechanism indicated at 22.

This drum is mounted on a suitable bracket 23 fixed to the carrier as indicated.

In addition to these adjustments, the cutting mechanism B is capable of pivotal or tilting movement on the lower end of the beam 10, so that the cutting mechanism can be arranged at any desired angle with relation to the ground to accomplish its purpose. In this connection the cutting mechanism B is provided with a segmental bracket 24 which forms part of a casting as clearly shown in Figure 3, while the curved portion of the bracket is provided with teeth 25, as clearly indicated in Figure 4. Meshing with these teeth 25 is a pinion 26 carried by the adjacent end of a shaft mounted on suitable bearings for rotation, and projecting above the carrier and arranged obliquely with relation thereto. This shaft includes telescopic sections and one of which is provided with a hand wheel 28 through the instrumentality of which the shaft can be rotated in either direction to tilt the cutting mechanism B as the occasion may require. This shaft is also provided with a ratchet wheel 30 with which a pivoted pawl 31 cooperates to hold the shaft against casual rotation. The lower end of this shaft is journaled in a casting 32 which is pivoted as at 33 as shown in Figure 4, the casting of which the segmental bracket forms a part being also pivoted on the lower end of the beam as illustrated.

The cutting mechanism as above stated is of ordinary well known construction but is adapted to be operated from any suitable source of power, and as shown in this specific instance is operated from one of the traction wheels of a truck, for which purpose I provide said wheel with a sprocket 33' over which is trained an endless chain 34. This chain extends upwardly and is also trained over the sprocket carried by a stub shaft 35, the latter being journaled in a bearing indicated at 36. One end of this shaft is equipped with a beveled gear 37 which meshes with a similar gear 38 carried by an operating shaft for the cutting mechanism. This shaft just mentioned includes telescopic section 39 and 40 respectively which allows the cutting mechanism to be adjusted vertically with relation to the ground in the manner above described. The section 40 of this shaft is journaled in an inverted U-shaped member which is also pivoted upon the casting above referred to and as clearly shown in Figure 3, and is equipped with a pinion 41 which meshes with a gear 42 carried by the shaft 43 which is journaled in said casting. Arranged on this gear is a disk 42' which operates a pitman 43 eccentrically connected with the disk, and also connected with the cutter bar of the cutting mechanism to reciprocate the latter incident to the rotation of the said disk. Consequently when the truck is in operation, the cutting mechanism is operated from the rear wheel thereof, and by reason of the construction and arrangement of parts above described, said cutting mechanism can be very easily and conveniently adjusted to meet the requirements and condition of the roadway to accomplish the purpose for which it is intended. However, it is to be borne in mind that power for operating the cutting mechanism can be obtained from any other suitable source, and the means herein shown for that purpose is merely illustrative of one embodiment of the invention.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

The combination with a support, of a guide mounted thereon and spaced therefrom, a beam slidable on the guide, means for adjusting the beam through the guide, a cutting mechanism pivotally mounted on the lower end of the beam and including a bracket having a toothed segmental portion, a shaft journaled on the support and arranged obliquely thereto, a gear carried by the shaft and meshing with the teeth of said segment, whereby said cutting mechanism can be adjusted pivotally with relation to said beam, and means for rotating said shaft.

In testimony whereof I affix my signature.

HALLEY A. SHEETS.